United States Patent
Schuler et al.

(10) Patent No.: US 6,595,572 B2
(45) Date of Patent: Jul. 22, 2003

(54) FOLDING TOP FOR VEHICLES, IN PARTICULAR PASSENGER CARS

(75) Inventors: Eckart Schuler, Sindelfingen (DE); Stefan Orth, Weil der Stadt (DE); Holger Röder, Eislingen (DE); Harald Bergerhoff, Messenbachhausen (DE)

(73) Assignee: CTS Fahrzeug Dachsysteme GmbH, Korntal-Munchingen (DE)

( * ) Notice: Subject to any disclaimer, the term of this patent is extended or adjusted under 35 U.S.C. 154(b) by 0 days.

(21) Appl. No.: 09/734,586

(22) Filed: Dec. 13, 2000

(65) Prior Publication Data

US 2001/0042991 A1 Nov. 22, 2001

(30) Foreign Application Priority Data

Dec. 13, 1999 (DE) .......................................... 199 60 010

(51) Int. Cl.$^7$ ................................ B60J 7/08; B60J 7/20; B62D 25/10
(52) U.S. Cl. .................. 296/107.08; 296/108; 296/76; 296/107.17; 296/117
(58) Field of Search .................. 296/108, 107.01, 296/107.08, 76, 136, 107.16, 107.17, 117

(56) References Cited

U.S. PATENT DOCUMENTS

| | | | | |
|---|---|---|---|---|
| 3,375,037 A | * | 3/1968 | Hunt, Jr. ..................... 296/117 |
| 4,929,015 A | | 5/1990 | Bauer ......................... 296/116 |
| 5,542,735 A | * | 8/1996 | Furst et al. ............. 296/107.08 |
| 5,655,331 A | | 8/1997 | Schrader et al. .............. 49/280 |
| 5,769,483 A | * | 6/1998 | Danzl et al. ................. 296/108 |
| 5,785,375 A | | 7/1998 | Alexander et al. |
| 5,810,422 A | | 9/1998 | Corder et al. |
| 5,823,606 A | * | 10/1998 | Schenk et al. ......... 296/107.08 |
| 5,944,378 A | * | 8/1999 | Mather et al. ......... 296/107.08 |
| 5,979,970 A | * | 11/1999 | Rothe et al. ........... 296/107.17 |
| 6,053,560 A | * | 4/2000 | Rothe ......................... 296/108 |
| 6,250,707 B1 | * | 6/2001 | Dintner et al. ................ 296/76 |
| 6,312,042 B1 | * | 11/2001 | Halbweiss et al. .......... 296/108 |
| 2002/0171258 A1 | * | 11/2002 | Obendiek .................... 296/108 |

FOREIGN PATENT DOCUMENTS

| | | |
|---|---|---|
| DE | 34 05 920 | 8/1985 |
| DE | 36 25 628 | 2/1988 |
| DE | 43 16 485 | 11/1994 |
| DE | 195 16 876 | 11/1996 |
| DE | 197 06 397 | 6/1998 |
| DE | 197 06 444 | 6/1998 |
| DE | 197 31 330 | 2/1999 |
| DE | 199 48 746 | 4/2000 |
| EP | 0 835 778 | 4/1998 |
| EP | 0 974 480 | 1/2002 |

* cited by examiner

*Primary Examiner*—D. Glenn Dayoan
*Assistant Examiner*—H. Gutman
(74) *Attorney, Agent, or Firm*—Crowell & Moring LLP (57) ABSTRACT

In a folding top for vehicles, in particular passenger cars, it is proposed to assign to the folding top, between its closing position and its put-away position, an intermediate position in which the folding top assumes a folded-together stowage position, from which the folding top can be transferred as a stack into the put-away position or can be unfolded into the closing position.

11 Claims, 8 Drawing Sheets

FOLDING TOP FOR VEHICLES, IN PARTICULAR PASSENGER CARS

BACKGROUND OF THE INVENTION

The invention relates to a folding top for a vehicle, in particular for a passenger car, which is capable of being adjusted between a closing position covering a vehicle space and a folded-together stowage position. In its stowage position, the folding top can be accommodated in a reception space of the vehicle. The folding top is pivotably connected to lateral carrying brackets assigned to the reception space and is supported against the vehicle body via these brackets.

Folding tops of the abovementioned type are known, for example, from DE 34 05 920 C2. In the form of a folding top for a convertible, the folding top is capable of being adjusted between a closing position covering a vehicle space and a put-away position. In the put-away position, the folding top is folded together and assumes a stowage position in which it can be accommodated in a reception space. The reception space is adjacent to the vehicle interior to be covered and is assigned lateral carrying brackets which are supported against the vehicle body and via which the folding top is articulated pivotably on the vehicle body.

Since the folding top, it its folded-together stowage position, is accommodated in the transitional region between the vehicle interior and the rear trunk, this necessarily gives rise, with respect to a given vehicle size, to certain restrictions in the amount of space available in the vehicle interior and/or in the trunk. At the same time, the situation is made more difficult by the fact that, depending on the size and design of the folding top, the carrying parts of the folding top sometimes have considerable dimensions which necessitate corresponding free spaces, particularly in the regions along the sides of the vehicle, and therefore restrict freedom in the configuration of other structural parts, such as, for example, tank filler necks.

These difficulties generally arising in the case of folding tops assume increasing importance when the aim is to achieve a compact vehicle design, since the folding top, when in its put-away position, then increasingly restricts the trunk volume and, in particular, is also detrimental to the loading capacity of the trunk.

This becomes particularly noticeable when the folding top is designed as a so-called hard top, as is known, for example, from DE 197 06 397 C1, since dimensionally rigid roof parts are then present and it is possible to adapt to the conditions of space in the put-away position only by mutual changes in the positions of the roof parts in relation to one another and in their position in relation to the parts delimiting the put-away space. There is the further difficulty, in the case of such folding tops of the hard top type, that the introduction of the relatively large-size folding top parts into the respective put-away space also makes it necessary to have appropriate access possibilities, thus leading to further conflicts in terms of construction space.

Furthermore, DE 199 48 746 A1 has already proposed a folding top for vehicles which is designed as a hard top and which consists of a front and a rear roof part connected via a telescopic rail guide, and in which, in order to open the folding top, the front roof part is first pushed in under the rear roof part, before the roof-part stack obtained as a result can be displaced into the trunk, along a rail guide fixed in position in relation to the body, with the rear flap open. The rail guide is formed by guide rails which are arranged laterally in the trunk, are located opposite one another and run parallel and which have an S-shaped run, so that, starting from a run of the roof parts in which these are flush with the surface, and with the folding top closed, the front roof part can be introduced under the rear roof part by means of an appropriately controlled sequence during the opening of the folding top and the roof stack formed thereby can be placed directly below the closed lid part covering the trunk.

Moreover, DE 36 25 628 A1 discloses a folding top of the hard top type which consists of a front and a rear roof part. The front roof part of the top is pivotably connected to the body in the region of the rear edge of the rear roof part via longitudinal spars engaging laterally over said rear roof part, the connection being made in the region of the lateral arms of a roll bar. The rear roof part is pivotably articulated, in the region of its front transverse edge, on the front roof part and is capable of being pivoted out of its closing position corresponding to the closed folding top upward through 180° into an opening position covering the front roof part. From this position, with the trunk lid open, the front and rear roof parts, jointly pivoted rearward through 180° via the articulation of the longitudinal spars can be placed in the region of the lid of the trunk, while the longitudinal spars of the front roof part, which then project forward, extend forward along the sides of the vehicle into the seat region.

DE 197 31 330 A1 shows a further design of a folding top for vehicles, in which the folding top is divided in two and has a front and a rear folding top part. The two folding top parts are assigned a common slide-and-fold covering which, with the folding top closed, runs in the region of the front folding top part between lateral spars which, starting from a folding top frame assigned to the rear folding top part, are adjacent to the scuttle cowl dash of the vehicle and, with the slide-and-fold covering open, can be folded in against the front transverse side of the folding top frame of the rear folding top part, the folding top frame forming a cassette-like receptacle for the pushed-together slide-and-fold covering. The folding top frame belonging to the rear folding top part is connected to lateral body columns (B-columns) in the transitional region to the front folding top part via a link mechanism and, together with a cloth-tensioning bar articulated on these columns, stretches out a foldable rear folding top which contains a rear window and which, when the cloth-tensioning bar is pivoted in against the folding top frame of the rear folding top part, can be folded down rearward, together with the folding top frame and the slide-and-fold covering received in a cassette-like manner by the latter, and can be put down on the trunk lid. This solution does not provide a stowage position within the trunk, nor can a folding top concept of this kind be implemented as a hard top.

SUMMARY OF THE INVENTION

The object on which the invention is based is to reduce the disadvantages and the restrictions which have been shown.

This is achieved, according to the invention, by providing that the folding top, in its folded-together stowage position, is capable of being displaced in its position in relation to the vehicle body as a result of the adjustment of the carrying brackets.

Since the folding top, in its folded-together stowage position, is capable of being displaced in its position in relation to the vehicle body as a result of the adjustment of the carrying brackets, this affords the possibility of carrying out the folding together of the folding top into its stowage position in a region in which conditions favorable in this respect exist. The roof stack thus formed, that is to say the folding top in its folded-together stowage position, can then be brought as a whole into the actual put-away position by a variation in the position of the carrying bracket. This makes the situation significantly easier, since, in the case of folding tops of the type referred to, when the folding top is transferred from its folded-together stowage position, particularly when this corresponds to a put-away position of the folding top, into the closing position, the carrying linkages have to cover considerable pivoting angles and pivoting travels, and the associated large pivoting angles necessitate large coverages in which overlaps with other structural parts may occur. Furthermore, such a solution also affords the possibility, as required, of transferring the folding top brought into a stowage position into positions in which the restrictions as regards the available loading volume of the trunk are reduced and/or access to this loading volume is improved.

With a view to these requirements, according to the invention the brackets may be displaceable in their vertical position in relation to the vehicle body, but also in the longitudinal direction of the latter, in which case conventional linkage guides or the like can be used in this respect. A configuration which is particularly advantageous and simple in terms of the purpose referred to is obtained when the brackets are arranged so as to be pivotable in relation to the vehicle body, specifically, in particular, so as to be pivotable in the vertical direction, while, in connection with an orientation of the brackets in the longitudinal direction of the vehicle, these preferably have essentially the same extent as the lateral folding top guide elements or are congruent with these in the vertical direction, so that the adjustability according to the invention of the brackets does not appreciably influence the space required for the folding top when the latter is in the stowage position.

Expediently, the brackets, when oriented in the longitudinal direction of the vehicle, are mounted in their longitudinally central region and are acted upon, in their front region with respect to the longitudinal direction of the vehicle, via a corresponding actuating device, for example hydraulic actuating cylinders, when the folding top is articulated in the rearward region of the brackets, so that, when the folding top in its folded-together stowage position is raised, it is also displaced forward and reaches an initial position which is particularly expedient for unfolding the folding top. Preferably, this raised initial position may at the same time form the position of the brackets which corresponds to the closing position of the folding top, while, starting from the put-away position, this initial position for transferring the folding top into its closing position may at the same time form an intermediate position which, in terms of the put-away space being assigned to the trunk, with the trunk open for loading, improves the possibilities of access to the trunk, despite the folding top being in the opening position, to the extent such that even relatively bulky articles can be introduced into the trunk.

In particular, a displacement of the folding top folded together into the stowage position by the adjustment, in particular the pivoting of the carrying brackets, in conjunction with articulation of the trunk lid, proves to be expedient, in which the trunk lid is opened for loading about a front transverse axis with respect to the direction of travel and, by pivoting about a rear transverse axis with respect to the longitudinal direction of the vehicle, is transferred into an opening position, in which the folding top can be introduced into the put-away space spanned by the trunk lid, in particular into the trunk. In conjunction with such an arrangement of the trunk lid, a pivotable mounting of the brackets also proves to be particularly expedient, in which, by the pivoting of the brackets, the folding top folded together into the stowage position is displaced obliquely forward and upward and thereby comes into the region which is exposed when the trunk lid is opened by pivoting about its rearward pivot axis.

BRIEF DESCRIPTION OF THE DRAWINGS

Further particulars and features of the invention may be gathered from the claims. Furthermore, the invention, together with additional features, is explained in more detail by way of the following exemplary embodiments. In the drawing:

DETAILED DESCRIPTION OF THE DRAWINGS

Figure 1:
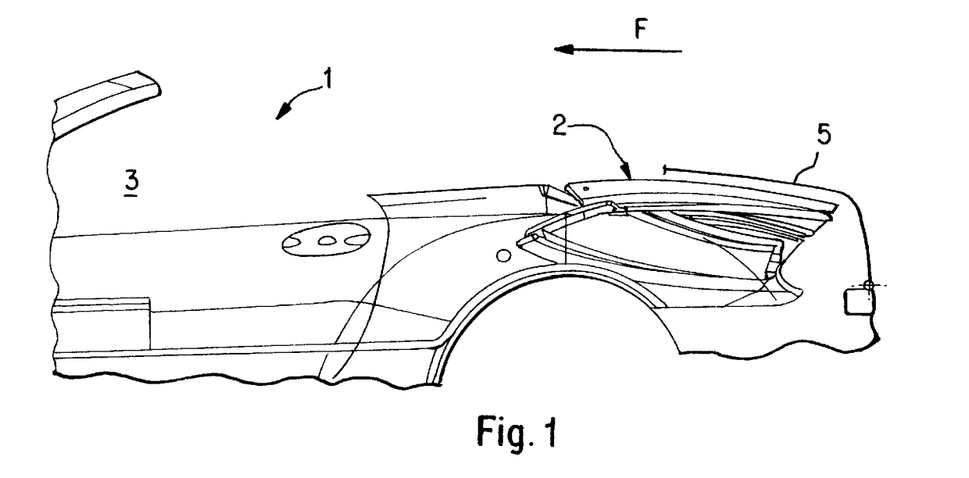
FIG. 1 is a diagrammatic part illustration of a convertible vehicle, of which the folding top, designed as a hard top, is in its put-away position, in which it occupies a part region of the trunk of the vehicle and is spanned by the trunk lid.
Figure 3:
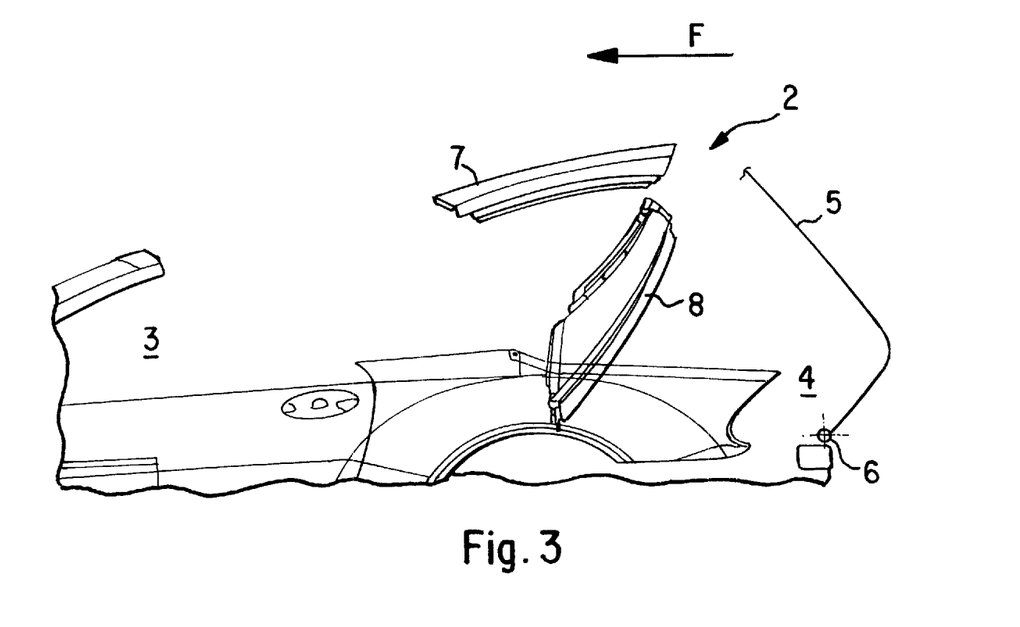
FIG. 3 is a transitional position of the folding top during the transfer of the latter into the closing position, starting from the intermediate position according to FIG. 2.
Figure 4:
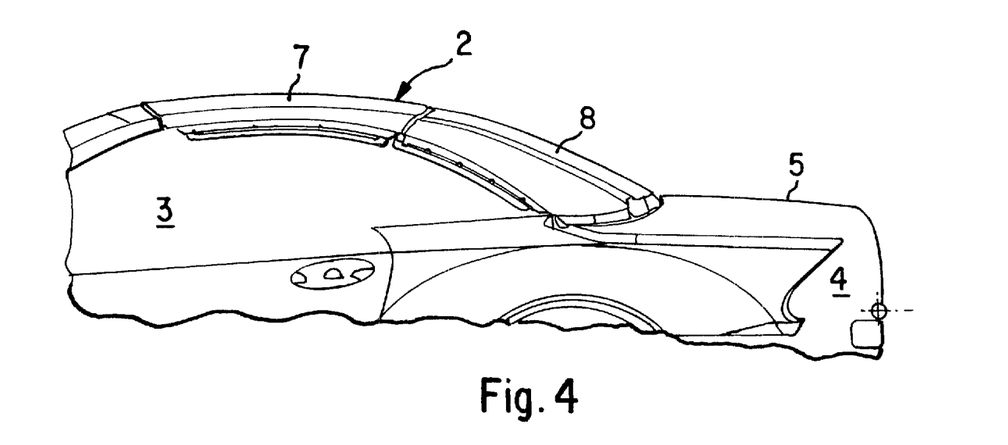
FIG. 4 is a similar view showing the folding top in its closing position covering the interior, the trunk lid being transferred into its closing position engaging forward over the trunk.
Figure 5:
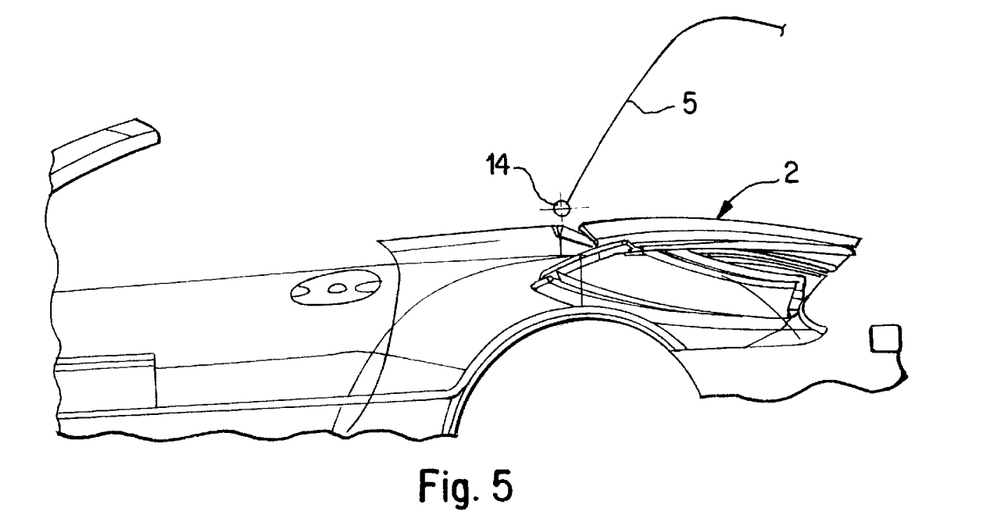
FIG. 5 is a similar view showing an arrangement, corresponding to that of FIG. 1, of the folded-together folding top put away in the trunk, in its put-away position, with the trunk lid folded up into an opening position about a front pivot axis and exposing the trunk for loading purposes.
Figure 6:
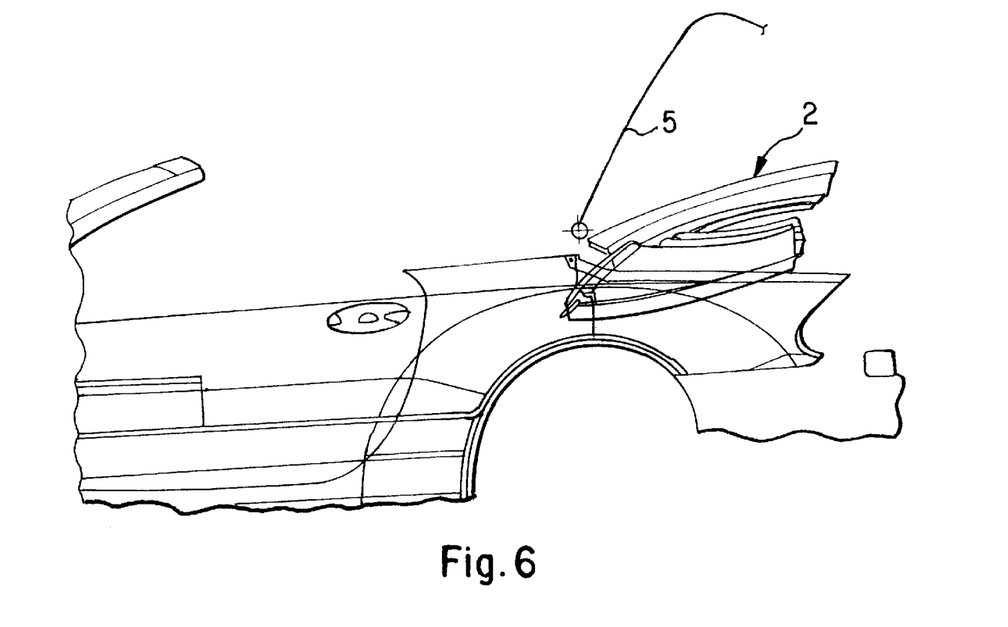
FIG. 6 is a similar view showing an opening situation, corresponding to that of FIG. 5, of the trunk of the vehicle, with the folding top folded together, the folding top as a whole, and in the folded-together state, being raised into an intermediate position corresponding to that of FIG. 2, so that an enlarged access orifice for loading the trunk is obtained.

The principles on which the invention is based are explained first with reference to FIGS. 1 to 4 and also FIGS. 5 and 6, and the subsequent FIGS. 7 to 11 illustrate the actual solution which is possible and advantageous in constructional terms. FIG. 1 shows a convertible passenger car 1, having a hard folding top 2. In its closing position (FIG. 4), the folding top 2 covers a vehicle interior 3 on the roof side.

When the folding top 2 is open, it is put away in the rear in the trunk 4 of the vehicle 1 and, as shown in FIG. 1, is covered by a trunk lid 5 which, for moving the folding top 2 into and out of the trunk 4, can be pivoted about a pivot axis, indicated by numeral 6, assigned to the rear end region of the vehicle 1 and running in the transverse direction of the vehicle, rearward into an opening position (FIGS. 2 and 3), in which the folding top put away in its put-away position (FIG. 1) in the trunk 4 is released and can be pivoted in the opposite direction, in the direction of its closing position according to FIG. 4.

As can be seen in FIG. 3, the folding top 2 designed as a hard top consists of a roof part 7 and of a rear-window part 8 which are connected pivotably to one another and to which a carrying linkage (FIG. 7), designated generally by numeral 9, is assigned in the connection to the vehicle body.

This carrying linkage 9 is carried (FIGS. 7 to 11) via a bracket 10 which, in turn, is connected to the vehicle body pivotably about a transverse axis 11 of the vehicle, this connection being made via a bearing block 15, against which is also supported the actuating device 13 which is formed, in the illustrated embodiment, by a hydraulic cylinder and via which the bracket 10 is capable of being pivoted about the axis 11.

Figure 2:
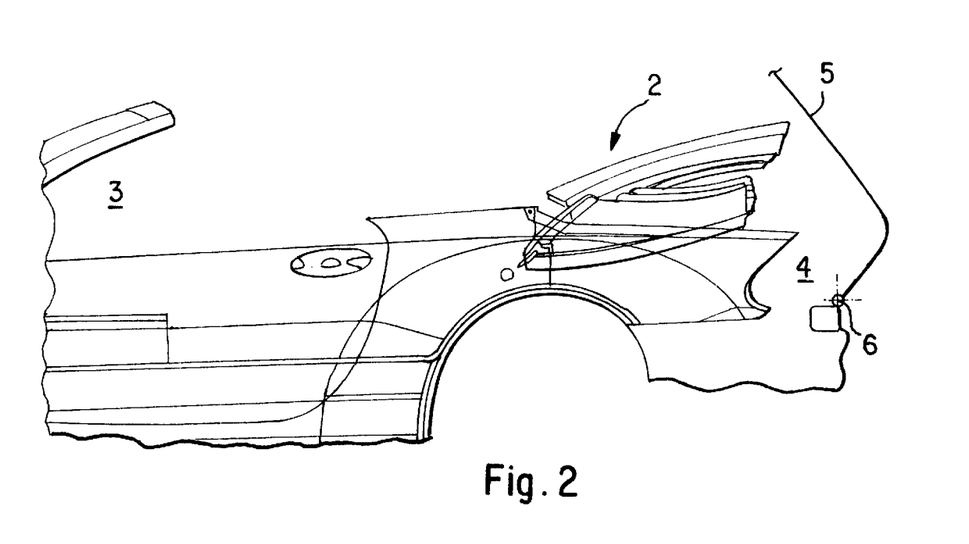
FIG. 2 is a basic illustration, corresponding to that of FIG. 1, of the convertible vehicle, when the trunk lid is pivoted, about a pivot axis assigned to the rearward lower end of the trunk lid with respect to the longitudinal direction of the vehicle, into a rearward opening position releasing the put-away folding top, and when the folding top is raised into an intermediate position, in this intermediate position the folding top being in a folded-together stowage position, as in FIG. 1.

During the transition from the FIG. 1 folding top put-away position, in the trunk 4 into the FIG. 4 closing position after the pivoting of the trunk lid 5 into its rearward opening position, the folding top 2 is first pivoted by the bracket 10 (FIGS. 7–11) into a raised intermediate position (FIG. 2) and, then starting from this intermediate position, moved into the closing position according to FIG. 4 as a result of the unfolding of the folding top 2. In this closing position, the bracket 10 remains in its raised intermediate position (folding position). Conversely, when the folding top is opened, the intermediate position according to FIG. 2 is first approached, the roof part 7 being folded in over the rear-window part 8 and both parts together being brought into the stowage position according to FIG. 2. Lowering into the trunk 4 as a result of the displacement of the bracket 10, in the illustrated embodiment as a result of the pivoting of the bracket 10, takes place thereafter. In this end position forming the put-away position, the folding top 2 can be covered by the trunk lid 5, so that a final position according to FIG. 1, covered by the trunk lid 5, is obtained for the put-away folding top 2.

When the folding top 2 is transferred into its closing position (FIG. 4), the trunk lid 5 is adjacent to the rearward end region of the folding top 2, specifically, as illustrated in FIG. 4, in the lower end region of the rear-window part 8.

In its put-away position, the folded-together folding top, particularly when the folding top 2 is designed as a hard top, occupies part of the vehicle volume otherwise capable of being utilized for the trunk. This situation also prevails over the width of the vehicle, even when the hard shells of the roof part 7 and rear-window part 8 partly themselves form components of the carrying linkage. This space requirement, already present in the stowage position, grows if the folding top 2 were unfolded, starting from its put-away position in the trunk, as is known per se, since the parts of the folding top, in particular its carrying linkage, have to cover long pivoting travels.

It becomes possible to avoid this space requirement and thereby also reduce the size of the stack which the folding top assumes in its folded-together stowage position in that the folding together of the folding top takes place in an intermediate position, in which the folding top is held via the bracket in a region (FIG. 2) which is displaced in the direction of the lid in relation to the put-away position (FIG. 1) and which can be occupied when the lid 5 is open. By virtue of this solution, otherwise unavoidable overlaps of structural parts, for example with a tank filler neck arranged in the region of the trunk and the like, can be avoided.

In a similar way to FIG. 1, FIG. 5 reveals that, depending on the size of the structural parts of the folding top, in particular depending on the roof part 7 and rear-window part 8, the put-away folding top 2 not only occupies a substantial part of the trunk 4, but also largely covers this in the direction of the rearward end of the vehicle 1. The result of this is that the folding top not only blocks part of the trunk volume, but also obstructs access to the remaining trunk volume, with the folding top 2 in the put-away position, and, where appropriate, no longer allows relatively large articles to be put away, irrespective of the trunk lid 5 being transferred into a forwardly and upwardly folded opening position about a pivot axis 14 lying in the front end region of the trunk 4 for the purpose of loading the trunk 4.

The solution according to the invention counteracts this disadvantage, in that, for the purpose of loading the trunk 4, the folding top 2, folded together in its stowage position to form a stack, can be brought, in particular pivoted or raised, into a position located at least partially outside the trunk 4, this again taking place by way of the corresponding adjustment of the brackets 10 which carry the folding top stack. Preferably, the loading position according to FIG. 6 is identical to the intermediate position according to FIG. 2, which corresponds to the stowage position of the roof, and can also be approached, for example, during the opening of the trunk lid 5.

A possible solution for the two-sided pivotability of the trunk lid is shown by way of example in DE 195 16 876 C1.

A functioning of the folding top according to the invention, such functioning having been described with reference to FIGS. 1 to 6, can be implemented in structural terms, for example, in a form such as is illustrated diagrammatically in FIG. 7, FIGS. 8 to 10 additionally showing different actuating positions for the folding top.

In FIG. 7, numeral 10 again designates the bracket which serves as an intermediate carrier of the folding top 2. The intermediate carrier is capable of being adjusted in relation to the body of the vehicle (which is not illustrated), while, in the diagrammatic illustration shown, the bracket 10 is carried via a bearing block 15 which is fixed in relation to the body of the vehicle (not shown). The bracket 10 is pivotably mounted in relation to the bearing block 15 via the axis 11 running in the transverse direction of the vehicle, in the illustrated embodiment the pivot axis 11 lying in the longitudinally central region of the bracket 10 extending in the longitudinal direction of the vehicle. The bracket 10 is supported, at its front end with respect to the direction of travel, against the bearing block 15 via an actuating device 13 in the form of a hydraulic actuating cylinder. The cylinder 13 is pivotably connected at its upper end to the bracket 10 at the articulation point 16 and, on the opposite side, is supported at its lower end against the bearing block 15 at an articulation point 17.

Figure 7:
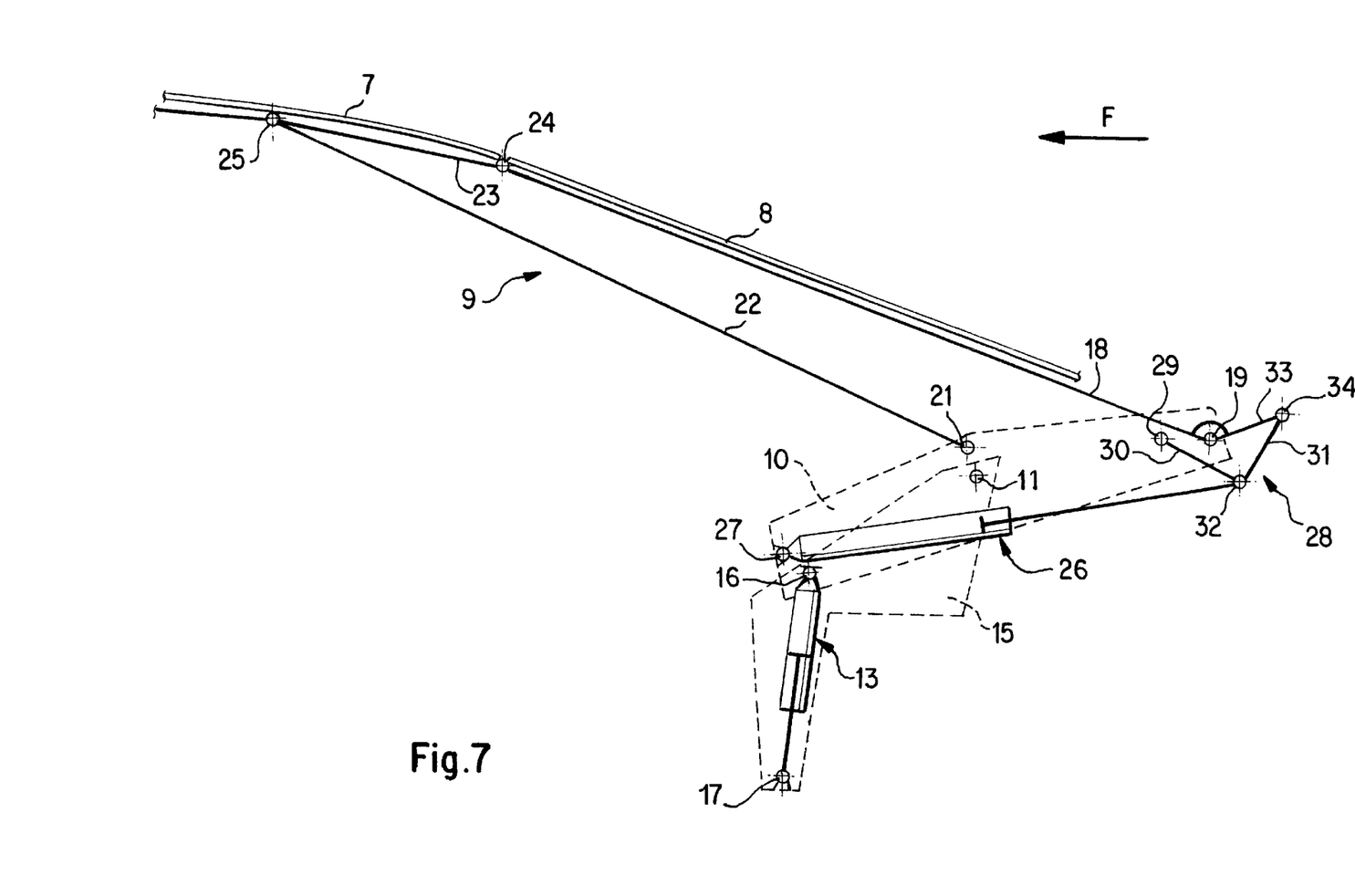
FIG. 7 is a diagrammatic illustration of the mechanism assigned to the folding top for articulation on the vehicle, in a positioning which corresponds virtually to the closing position of the folding top according to FIG. 4, the associated body parts of the vehicle not being illustrated.

In the end region located opposite the actuating device 13, that folding top link 18 of the carrying linkage 9 which carries the rear-window part 8 is mounted on the bracket 10 at the articulation point 19. The bracket 10, as the base of the carrying linkage 9, is connected, at an articulation point 21 located in the region of the pivot axis 11, to a further link, i.e., the guide link 22, which, together with the folding top link 18, carries a coupling link 23, of which the articulation points on the link 18 and on the link 22 are designated by 24 and 25. The coupling link 23 carries the roof part 7 and the folding top link 18 carries the rear-window part 8.

The illustration according to FIG. 7 makes clear a positioning of the carrying linkage 9 and of the bracket 10 which corresponds to the closing position of the folding top, that is to say a position according to FIG. 4, in which the bracket 10 is displaced upward in relation to the trunk 4. This is achieved, with respect to the solution according to FIG. 7, as a result of the pivoting of the bracket 10 about the transverse axis 11 of the vehicle via the actuating device 13. The pivotability about a fixed transverse axis 11 of the vehicle constitutes a solution which can be controlled in a particularly simple way in structural terms. Within the scope of the invention, however, other possibilities for the adjustment of the bracket are also possible, such as, for example, via links or the like.

The carrying linkage 9 is adjusted in relation to the bracket 10 via an actuator in the form of an actuating cylinder 26 in the form of a hydraulic cylinder which extends essentially along the bracket 10 and is pivotably supported at an articulation point 27 on the bracket side in the front end region of the bracket 10. The actuating cylinder 26 engages on the folding top link 18 via a toggle lever linkage 28 consisting of a lever 30 articulated on the bracket 10 at the point 29 and of a lever 31 which is pivotably connected to the lever 30 at the point 32 and acts on the link 18 via a lever arm 33. The lever 31 and the lever arm 33 are connected at the articulation point 34, and the lever arm 33 projecting from the link 18, rigid in respect of the latter, in the region of its articulation point 19 on the bracket 10.

Figure 8:
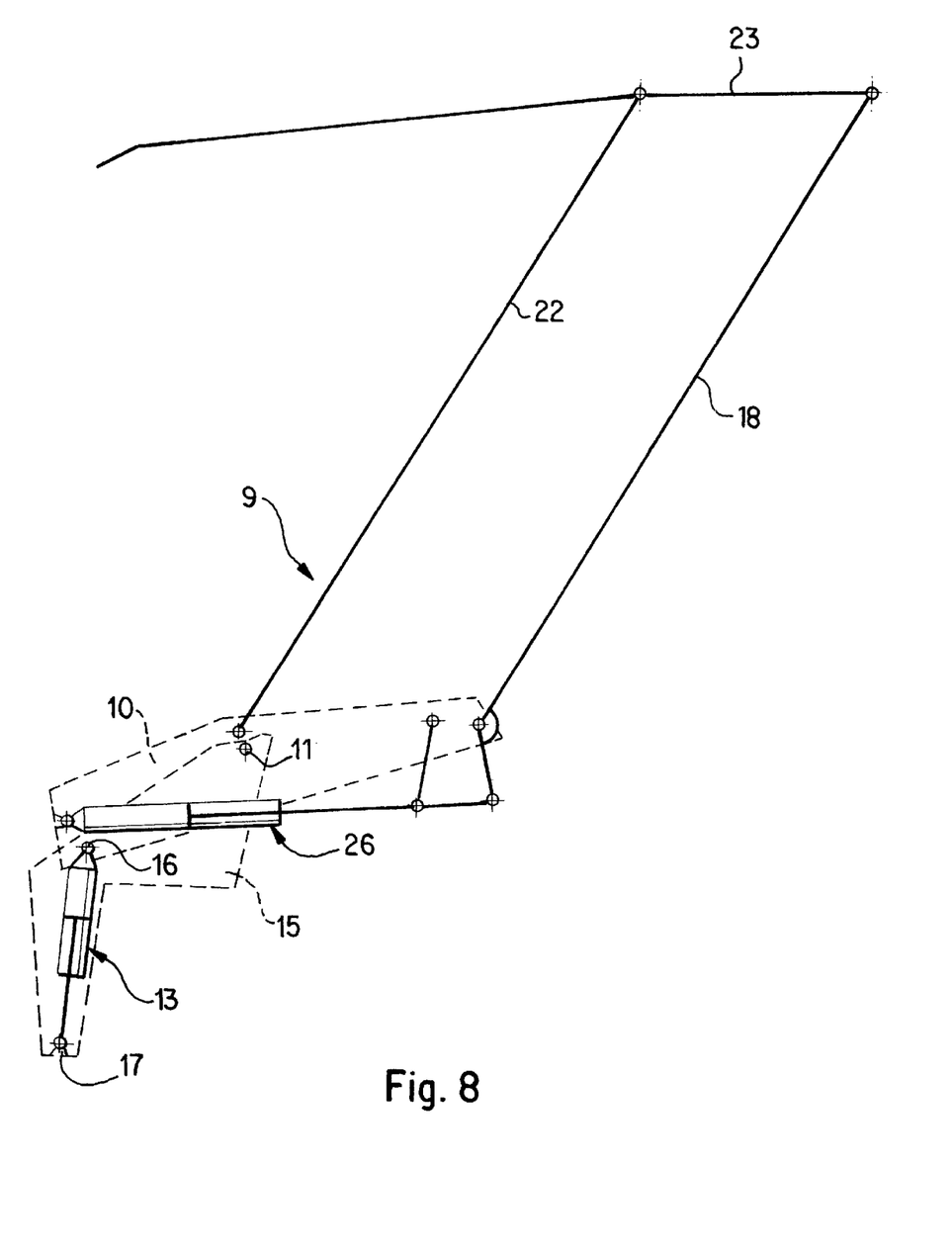
FIG. 8 is an illustration corresponding in principle to that of FIG. 7, with the folding top mechanism being in a position in which the folding top, not illustrated in any more detail, is in a transitional position between its closing position (FIG. 4) and its folded-together stowage position (FIG. 2)

When the cylinder forming the actuator 26 is retracted, the carrying linkage 9 first assumes a position shown in FIG. 8, which corresponds approximately to an intermediate position of the folding top 2 according to FIG. 3 and in which the rear-window part 8 and correspondingly the links 18 and 22 of the carrying linkage 9, which as a whole form the C-column of the folding top 2, pivot rearward and downward clockwise, starting from the closing position according to FIG. 4, so that, further along the pivoting travel, the shell-shaped roof part 7 and the likewise shell-shaped rear-window part 8 come to rest one above the other, with their inner faces confronting one another.

Figure 9:
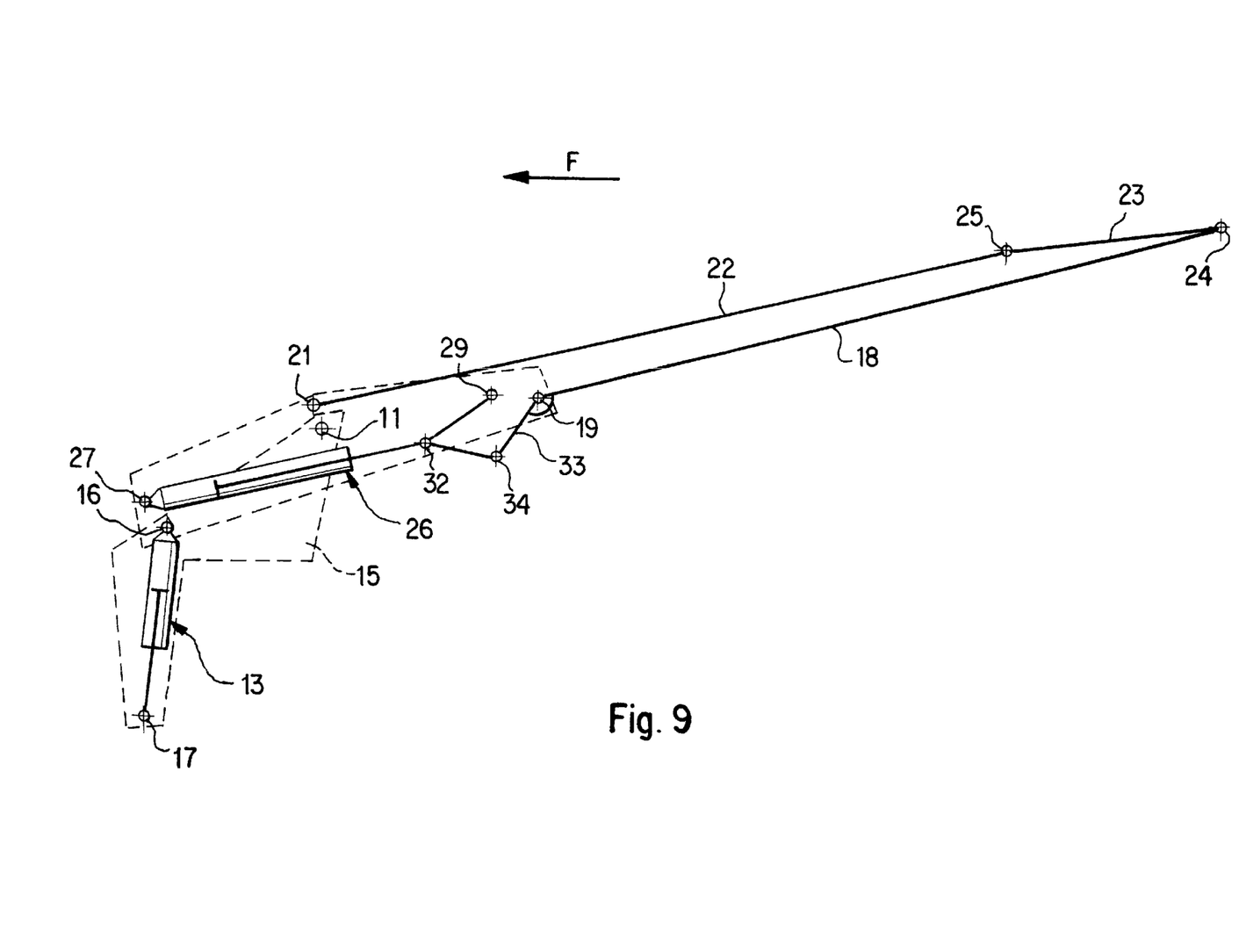
FIG. 9 is an illustration of the folding top linkage in a position which corresponds to the position according to FIG. 2 or FIG. 6 and in which the folding top assumes its stowage position.
Figure 10:
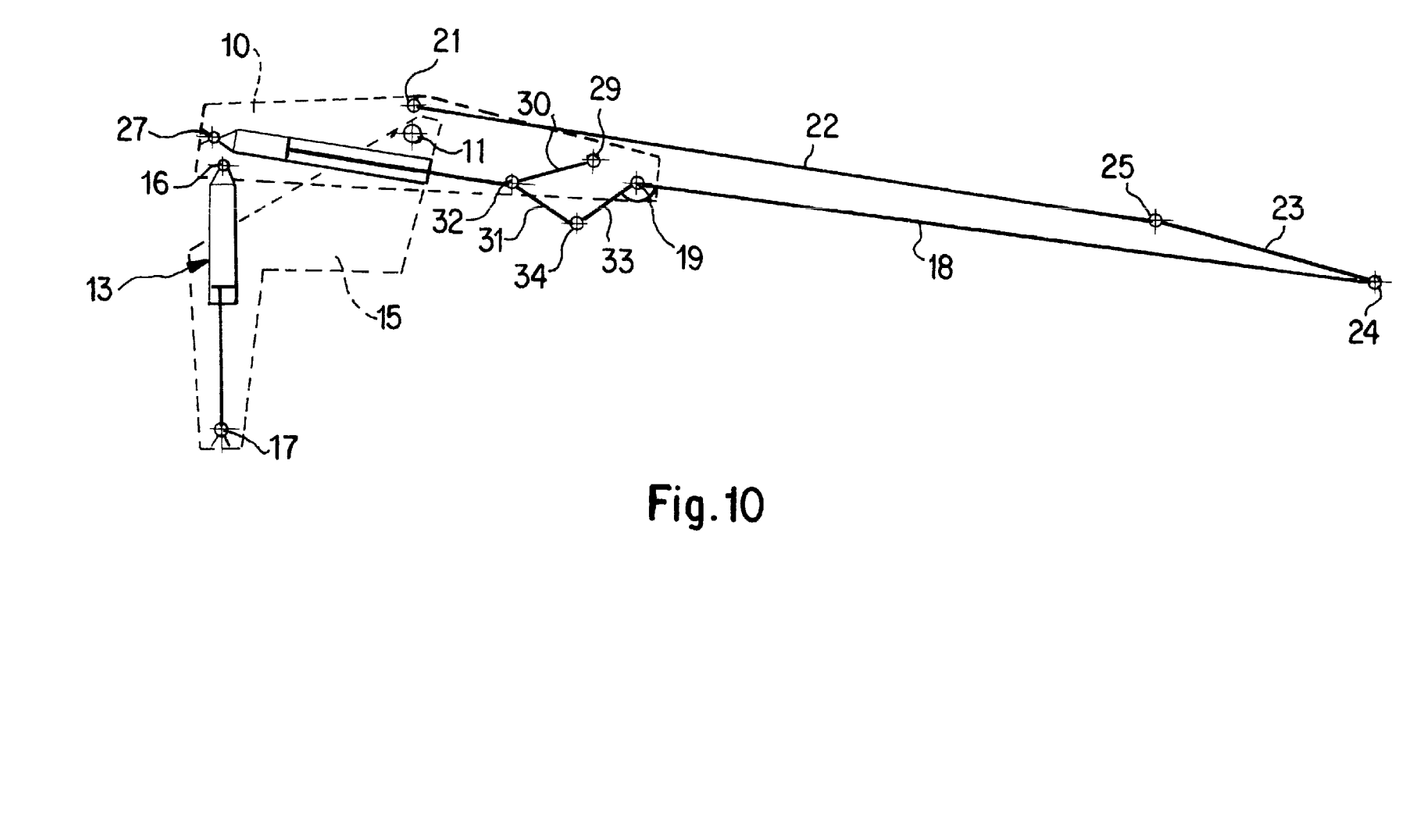
FIG. 10 is an illustration of the folding top linkage in a position corresponding to the put-away position of the folding top according to FIG. 1.

FIG. 9 shows a folded-together position of the carrying linkage 9 or of the folding top which is reached in a continuation of this pivoting movement, with the bracket 10 remaining in the same position, said position corresponding approximately to the position of the folding top in FIGS. 2 and 6.

From this intermediate position, in which the folding top forms a folded-together stack, the folding top as a whole, while the position of the folding top parts in relation to one another is preserved, can be transferred, as a result of the pivoting of the bracket 10 with the effect of a lowering into the trunk 4, into its put-away position, in which said folding top can be covered via the trunk lid 5, as illustrated in FIG. 1. Insofar as is expedient for understanding, the reference symbols according to FIG. 7 are adopted for FIGS. 8 to 10.

In the foregoing description, it is assumed that each side of the vehicle is assigned a carrying structure according to FIG. 7, with the associated actuating elements being activated synchronously along with the hydraulic actuating device 13 and the actuator in the form of a hydraulic actuating cylinder 26. Within the scope of the invention, however, it is also possible to connect the brackets to one another and to assign a common actuating device 13 to the brackets.

Figure 11:
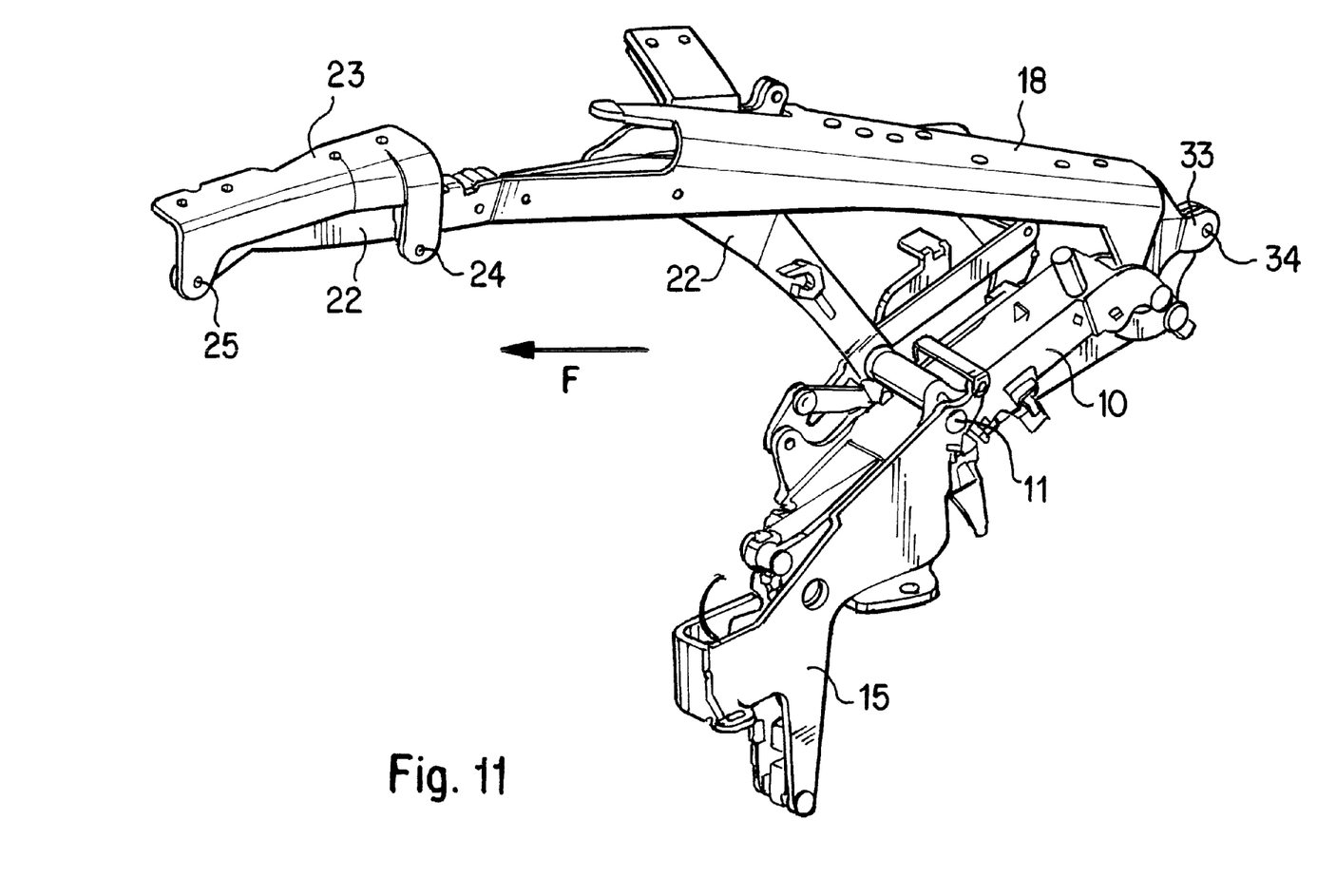
FIG. 11 is a diagrammatic perspective illustration of a form of construction of the folding top mechanism assigned to one side of the vehicle, without the associated folding top parts.

A folding top guide mechanism according to FIG. 7 is designed for practical purposes, as shown in FIG. 11, in which, for guidance, the arrow F indicates the forward direction of travel of the vehicle (not shown), the same reference symbols are used for corresponding parts in FIGS. 7 and 11 and the embodiment illustrates that a folding top guide mechanism according to the invention has a compact build, even in a solution for practical purposes, and can be used so as to save construction space.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A folding top for vehicles having a rearward-side trunk arranged to be coverable by a trunk lid, the trunk lid swivellably openable about a transversely extending swiveling axis at a front end thereof into a loading position, the folding top being adjustable between a closing position for covering a vehicle interior portion and a stowage position where the folding top is foldable together and accommodatable in a covering area below the trunk lid in the trunk, the folding top comprising:

adjustable carrying linkages operatively connected with lateral carrying brackets assigned to a trunk-side reception space of the folding top, the folding top being supported by the carrying brackets against a vehicle body and being displaceable in a folded-together condition by adjusting the carrying brackets with respect to the vehicle body, wherein the brackets are in an upper position when the folding top is in the closing position, wherein the brackets are in a lower portion when the folding top is in the stowage position, wherein the brackets, with the folding top being folded together, are in a raised position relative to the lower position, wherein the brackets are adjustable from said lower position into the raised position when the trunk lid is swiveled into the loading position and the folding top is folded together, and wherein the folded together folding top is situated at least partially outside the trunk when the brackets are in the raised position.

2. The folding top as claimed in claim 1, wherein a longitudinal orientation of the brackets is changeable during pivoting of the brackets in relation to the vehicle body.

3. The folding top as claimed in claim 1, wherein the brackets are pivotable about an axis running in a vehicle transverse direction.

4. The folding top as claimed in claim 1, wherein the brackets extend in the vehicle longitudinal direction.

5. The folding top as claimed in claim 4, wherein the brackets are pivotable about a pivot axis lying in a longitudinally central region thereof.

6. The folding top as claimed in claim 5, wherein an actuating device is operatively associated with the brackets on an end face of the latter.

7. The folding top as claimed in claim 6, wherein the actuating device is assigned to a front end region of the brackets with respect to the vehicle longitudinal direction.

8. The folding top as claimed in claim 6, wherein the actuating device is formed by an actuating cylinder.

9. The folding top as claimed in claim 1, wherein articulations of the folding top which are assigned to the brackets are provided in a rearward region of the brackets.

10. The folding top as claimed in claim 1, wherein the trunk lid and the brackets are pivotable simultaneously.

11. The folding top as claimed in claim 1, wherein the trunk lid is configured to be pivoted about a rearward axis with respect to a vehicle longitudinal axis, such that, with the trunk lid open, the brackets are adjustable into the upper position.

* * * * *